Dec. 7, 1954 L. S. BARKSDALE 2,696,219
FLUID VALVE
Filed March 27, 1951 2 Sheets-Sheet 1

LILBURN S. BARKSDALE
INVENTOR.

BY *Forrest F. Lilley*

ATTORNEY.

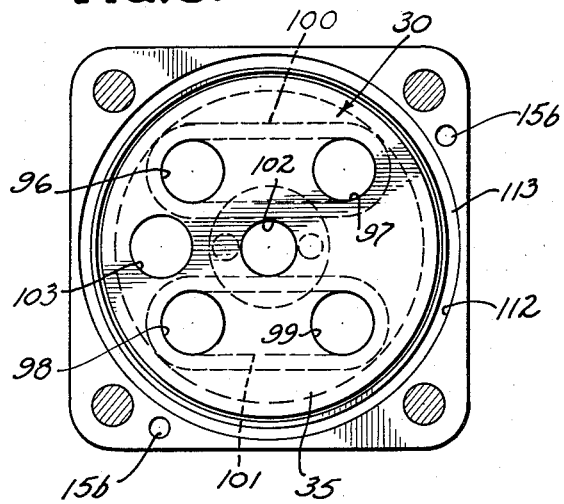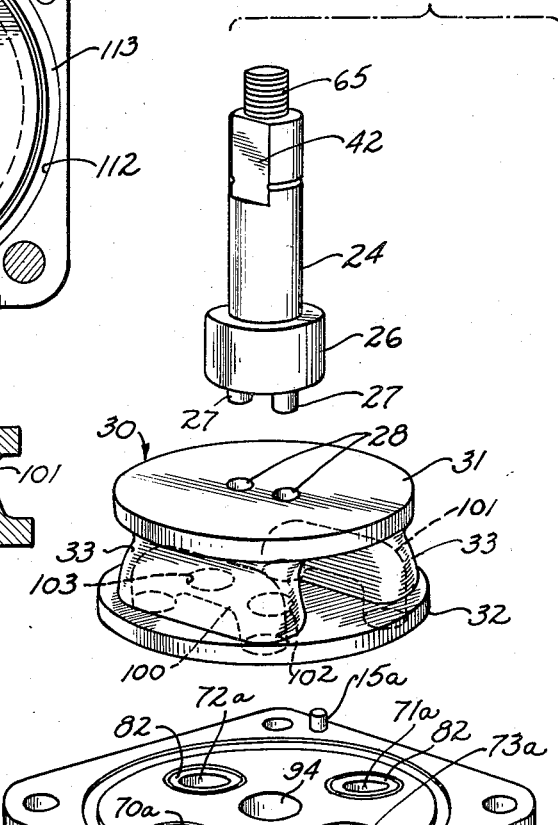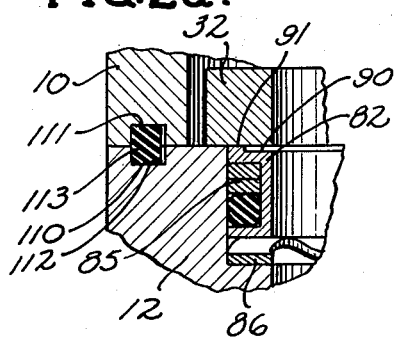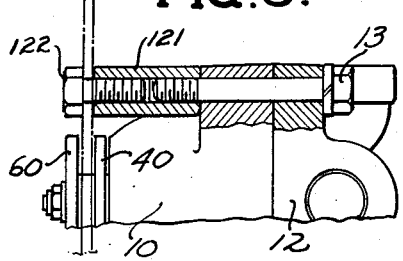

United States Patent Office

2,696,219
Patented Dec. 7, 1954

2,696,219

FLUID VALVE

Lilburn S. Barksdale, Los Angeles, Calif.

Application March 27, 1951, Serial No. 217,825

2 Claims. (Cl. 137—621)

This invention relates generally to fluid valves, and more particularly to fluid selector valves controlling high pressure fluids, e. g., fluids at pressures of the order of 1500–6000 p. s. i.

The invention is directed, in one principal aspect, to improvements in selector valves of a type employing a ported valve rotor equipped with spring actuated axially movable ring seals engaging a flat polished surface of the ported rotor surrounding the high pressure ports of the rotor. The ring seals, protected against leakage around their outsides by synthetic rubber O-rings, very successfully seal against leakage of high pressure fluids.

Valves to which the present invention may be applied are typically of the four-way selector type, although modified forms may be of the three-way or two-way types or they may be simple shut-off valves, dual pressure valves, manipulator valves, or other types.

General objects of the invention include the provision of improved features of construction, pressure-sealing, and control, with a view toward reduced cost of manufacture, long life, low maintenance, ease of assembly and disassembly for servicing purposes, improved sealing against leakage of the high pressure fluid, and increased versatility in application and control functions.

The invention in its various phases may be most readily understood by referring at once to a detailed description of a present illustrative embodiment of four-way selector valve, reference being had to the accompanying drawings, in which:

Figure 2a is an enlarged fragmentary detail taken from Figure 2;

Figure 5 is a section taken on line 5—5 of Figure 2;

Figure 6 is an exploded view showing the valve body, valve rotor, and actuating shaft;

Figure 7 is a section through the rotor taken on line 7—7 of Figure 2; and

Figure 8 is a half-elevational view of the valve showing a panel mounting type of installation.

Figure 4:
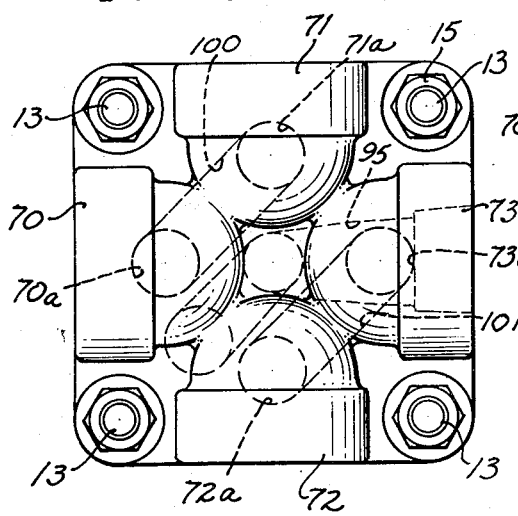
Figure 4 is a bottom plan view of the valve.

The valve casing is made up of an upper housing 10 and a lower body 12, having plane faces 10a and 12a, respectively, meeting on a transverse parting plane, and secured in assembly with one another by screws 13 passing downwardly through lugs 14 formed on housing 10 just above said transverse plane, and extending on down through body 12, together with nuts 15 screwed on the lower ends of said screws 14 and set up against the underside of the valve body, as indicated in Figure 4. To facilitate proper assembly, body part 12 is formed with projecting positioning pins 15a, which are received in corresponding sockets 15b when the housing part 10 is assembled properly with body part 12.

As will be appreciated from what follows, the body 12, together with a later described valve rotor, carries the high pressure fluid, and said body is accordingly formed of high tensile stress material, such as the material known as hydraulic bronze. The housing part 10, on the contrary, does not carry high pressure fluid, and can accordingly be cast in cheaper materials, for instance, cast iron. It is accordingly a feature of the invention that the valve casing as a whole has been formed with a transverse parting plane between the portion 12 which carries the high pressure fluid and the portion 10 which carries only low pressure fluid, so that the latter need not be made of expensive, high tensile strength material, thus bringing about a cheaper construction than would otherwise be possible, yet without sacrificing any necessary strength.

A circular cavity 16 extends upwardly into the bottom of housing 10, and has a reduction at 16a to form the outer race for ball bearings 17, said balls being retained adjacent race 16a by annular retainer 18. Above the balls 17 is a thrust washer 20, and above the latter are thin shims 21 seating against a downwardly facing housing surface 22 forming the top of the body cavity 16. An axial bore 23 extends through the top of housing 10 from surface 22 and rotatably receives actuating shaft 24. This actuating shaft 24 has immediately below surface 22, and positioned against the latter, an enlarged cylindrical head 26, and the lower end of the latter carries spacer pins 27 which engage in corresponding sockets 28 formed in the top of valve rotor 30. Shaft bore 23 is counterbored to receive sealing means in the form of rubber O-ring 23a.

Figure 2:
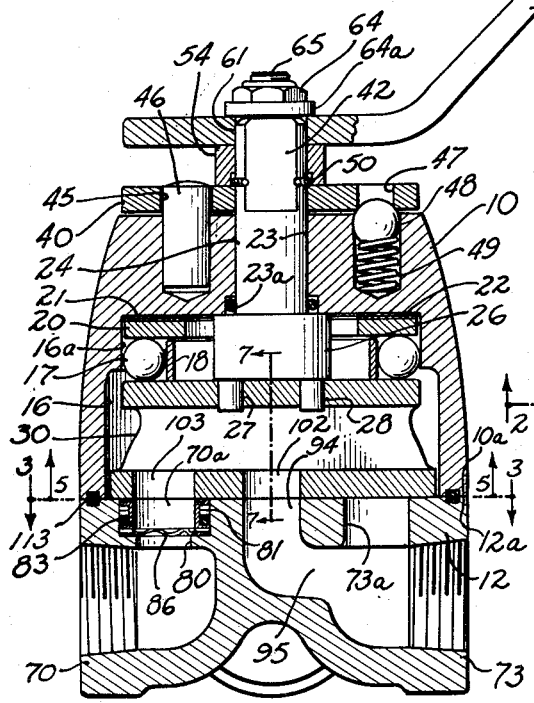
Figure 2 is a vertical longitudinal section taken on line 2—2 of Figure 1, with the valve rotor in centered position, and in "open-center" arrangement.
Figure 1:
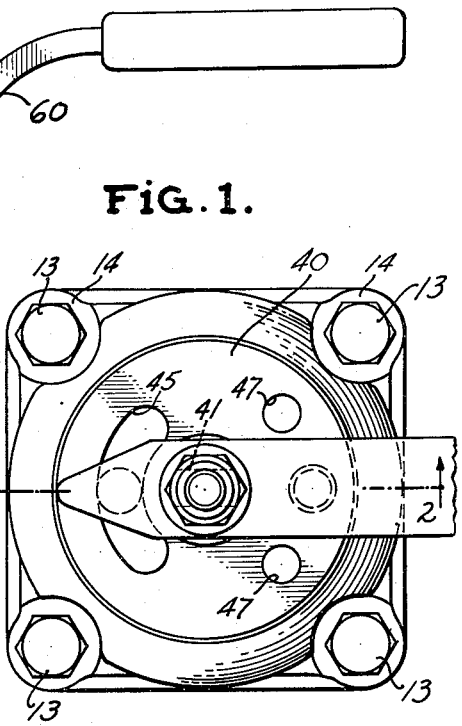
Figure 1 is a top plan view of a valve in accordance with the invention.

The valve rotor 30, which must also be composed of strong material, and is preferably a steel casting, comprises upper and lower circular plate portions 31 and 32, respectively, integrally joined by two parallel laterally spaced portions 33, one on each side of the center of the rotor. The upper surface of plate portion 31 is ground and polished, and engages the balls 17, and it will be seen that the rotor 30 is axially positioned by the balls 17, thrust washer 20 and shims 21. The face 35 of lower rotor plate 32 is ground and preferably lapped to an optically flat finish, and is substantially in the transverse parting plane between body part 12 and housing part 10, as clearly shown in Figure 2. The porting of the valve rotor 30 will vary with different valve applications, but a present preferred porting arrangement, designed for a particular purpose in accordance with one aspect of the present invention, will be described presently.

Positioned immediately above the flat upper end of valve housing 10 is a detent plate 40, formed with a central flat-sided aperture 41 to receive the flat-sided section 42 at the upper end of actuating shaft 24. Detent plate 40 accordingly turns with actuating shaft 24. The plate 40 is provided in one side with an arcuate slot 45 receiving a stop pin 46 projecting upwardly from the top of housing 10, and the length of this slot 45 is such as to permit the actuating shaft an angular travel of 90°. Plate 40 is also provided with three circular apertures 47, spaced 45° apart, and engageable with these apertures is a spring-pressed detent ball 48 mounted in a socket 49 sunk in the top end of housing 10. This spring-pressed detent ball 48 coacts with the apertures 47 to position the valve actuating shaft 24, and therefore the valve rotor 30, either in a centered position, or either one of two operating positions spaced 45° on either side of center.

A snap ring 50 engaging in a groove around shaft 24 just above retainer plate 40 secures the shaft 24 against axial displacement in a downward direction during assembly or disassembly operations. Above plate 40 is a spacing washer or annulus 54, and mounted on the upper flattened end portion 42 of shaft 24, in engagement with spacer 54, is operating handle 60. The mounting end of this handle 60 has a flat sided aperture 61 to cooperate with the flattened upper end 42 of shaft 24, and the handle is secured in position by means of a lock nut 64 threaded onto the screwthreaded upper extremity 65 of shaft 24 and set tightly down against a washer 64a positioned immediately above the handle member 60.

In the porting arrangement of the present illustrative valve, the body part 12 is formed with four tapped tubular bosses 70, 71, 72 and 73. The tubular boss 70 is the pressure fluid inlet, the bosses 71 and 72 lead to the opposite ends of a work cylinder, not shown, and the boss 73 leads to "return." The fluid passages within these tubular bosses 70—73 communicate with fluid ports 70a to 73a, respectively, opening through surface 12a. Described more specifically, each of ports 70a, 71a and 72a (of which port 70a is typical) consists of a bore 80 extending upwardly a short distance from the fluid passage within the corresponding coupling boss, and a deep counterbore 81 extending downwardly from valve body face 12a. Positioned in each of the counterbores 81 is a wear resistant sealing ring 82, formed with an exterior groove 83 in which is lodged a rubber O-ring 84 and a leather backing ring 85. A spring, preferably a marcel spring washer 86, urges the sealing ring 82 into engagement with the polished surface 35 of rotor 30, and the end of the sealing ring 82 facing rotor 30 is counterbored as at 90, to leave as a sealing element a narrow marginal rim portion 91. This narrow marginal rim portion 91 is ground, polished and preferably lapped to an optically flat finish, and bears in sealing engagement, under the force of spring 86, and also under the pressure resulting from pressure fluid acting against the differential of areas between the two ends of the sealing ring, against the polished surface 35 of the rotor.

Figure 3:
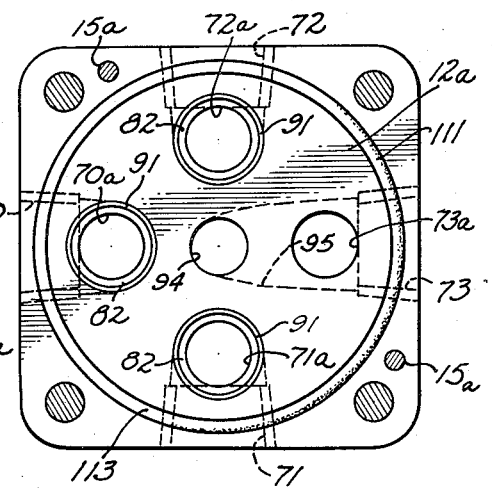
Figure 3 is a section taken on line 3—3 of Figure 2.

As will be seen from an inspection of Figure 3, the three ports, thus defined by sealing elements 91, are spaced in symmetrical arrangement 90° apart, while the fourth port 73a is not normally provided with a sealing ring, though in cases where excessive back pressure is encountered, the port 73a may also be provided with a sealing ring. The valve body surface 12a (see Figures 2 and 3) is also provided with a central port 94, communicating via bypass passageway 95 with the fluid passage in the tubular boss 73 leading to "return."

The polished lower surface 35 of valve rotor 30 is formed with four ports 96, 97, 98 and 99, spaced equidistant from the rotor axis, and arranged at 90° spacings. These ports are so located as to be capable of registering with the ports 70a to 73a of valve body member 12. The ports 96 and 97 are interconnected by means of a passageway 100, and the ports 98 and 99 are interconnected by a passageway 101, these passageways 100 and 101 being formed inside the two interconnecting portions 33 of the valve rotor, as will be readily understood from an inspection of Figure 6. Valve rotor 30 also has a central port 102 extending through lower plate 32, said port registering with valve body port 94, and it has also a port 103 extending through plate 32 and located midway between the ports 96 and 98, the port 103 being capable of registration with valve body port 70a in the neutral or centered position of the valve.

In the neutral or centered position of the valve, shown in Figures 1, 2, 5 and 6 of the drawings, the high pressure fluid entering through tubular boss 70 passes upwardly through port 70a into and through port 103 of the valve rotor, thence passing through the open space between the two rotor portions 33 to reach the centrally located port 102, through which it passes to enter body port 94 and be discharged via passageway 95 and outlet boss 73 connected to return. Accordingly, in the centered position of the valve, the high pressure fluid goes straight through the valve and back to return. Assume now that the valve handle is actuated to turn the rotor through 45° to either one side or the other, for example in a righthanded direction as viewed in Figure 1. This will bring the passageways 100 and 101 of the valve rotor to the positions indicated in dotted lines in Figure 4, with rotor port 96 in communication with pressure fluid port 70a, rotor port 97 in communication with work cylinder port 71a, rotor port 98 in communication with work cylinder port 72a, and rotor port 99 in communication with "return" port 73a. Accordingly, pressure fluid is delivered through the described ports and passageways to one end of the work cylinder, and returns from the other end of the work cylinder through the valve to return, it being understood that the "return" line may lead either to a pressure fluid reservoir, or to the intake side of a pressure fluid delivery pump, or the like. Actuation of the valve handle in the opposite direction from center of course sends pressure fluid to the work cylinder to move the piston therein in reverse direction, with return of pressure fluid through the line and passageways previously used to deliver the pressure fluid.

In some applications, it is desired that the pressure fluid be blocked from flowing through the valve in the centered position of the valve rotor. It is a feature of the present valve that the same valve parts as described may be rearranged in position to accomplish this "closed-center" result. All that is required is to remove the handle and detent plate, turn the actuating shaft through 180°, and reassemble. The port 103 in the valve rotor is then shifted to a position where it will have no effect on valve operation, and in the centered position of the valve handle, the pressure fluid is effectively blocked by the valve rotor.

The sealing rings 82 described hereinabove provide effective sealing of the high pressure fluid between the sealing ring and the polished lower surface 35 of the valve rotor. Fluid may interflow into the cavity 16 of housing part 10 during rotation of the valve rotor from one position to another, or may flow into the valve cavity 16 in the open-center position of the valve. In the first case, the pressure is greatly reduced upon the fluid reaching the cavity 16, and in the second, the cavity is open to the return line, so that no high pressure condition develops inside the cavity 16. It is for this reason that the housing part 10 need not be composed of the same expensive high tensile strength material as is requisite for the body part 12 which must carry fluid under very high p. s. i.

One further novel feature of advantage remains to be described. The meeting faces of the valve casing parts 10 and 12 require sealing to prevent leakage of the pressure fluid, and for this purpose, the face 12a is formed with an annular groove 110, and the facing wall of housing 10 is formed with an annular groove 111. Attention is directed to the fact that the bottom of groove 110 and the bottom of groove 111 are spaced on opposite sides of the transverse parting plane between the valve casing parts 10 and 12. Compressed into the annular channel 112 so formed is a synthetic rubber O-ring seal 113, whose cross-sectional diameter is greater than the combined depth of the two grooves 110 and 111. With this novel arrangement, any fluid under greater pressure than atmospheric will press and flatten the O-ring seal against the outer peripheral wall of the annular channel 112, causing the O-ring to bridge across and seal the juncture of the valve body parts 10 and 12. The novel feature of the arrangement as thus described is that the channel 112 is not formed wholly in one of the two facing members of the valve body, but is divided between the two, with the bottom surfaces 110 and 111 of the channel spaced on opposite sides of the parting plane. With the O-ring channel formed entirely in one of the body members or the other, the tendency is for leakage fluid to work around the O-ring, pressing it downwardly, or upwardly, as the case may be, and so finding an escape path. But with the arrangement as described, the O-ring is flattened against the juncture, and leakage is effectively blocked.

One other feature is worthy of mention, in that the shims at 21 enable very precise positioning of the valve rotor with respect to the valve body surface 35. If desired, substantially an interference fit may be provided, or, depending upon conditions, a few thousandths clearance may readily be obtained by removal of shims. This clearance may be of advantage, in that it permits a controllable degree of bypassing of pressure fluid under any given operating condition. The bypassing referred to results from the fact that whenever a valve rotor port is only partly registered with a ring seal, fluid passing through the ring seal is enabled to pass into the rotor port and then out into the clearance space between the valve rotor and valve body surface 12a. This bypassing fluid finds its way to "return," and a continuous bypassing circulation of this type can be set up in any increment depending upon the clearance adjustment. This controlled bypassing reduces surges into the work cylinder when the valve is actuated. It also controls the linear speed of the work cylinders, and it allows the work cylinder to be maintained in any given position in a state of equilibrium.

Figure 8 shows how the valve of the invention can be panel mounted. In this case, the screws 13 and nuts 15 are removed, and the screws 13 then installed from below. Long nuts 121 are screwed onto the screws 13 from above. The screws 13 reach only part way through nuts 121, so that the nuts 121 are capable of receiving panel mounting screws 122. As shown, the nuts 121 abut the panel 123, and the panel mounting screws 122 pass through the panel and are screwed into the outer ends of nuts 121 to secure the valve fast to the panel. In this connection, the retainer ring 50 is of advantage, in that it holds the actuating shaft assembly, the detent disk, and the detent ball in position when the handle 60 is removed during installation of the valve.

Attention is also directed to the fact that all parts of the valve which are subject to wear and servicing can be readily disassembled without disconnection of the valve from the fluid lines. That is to say, the housing 10, with its contained parts, can be removed merely by removing the four assembly screws, and the seal rings 82 can then readily be removed from the body 12, all without disturbing the body 12, which remains coupled to the fluid lines.

The invention has now been described as embodied in one single illustrative form. It is to be understood, however, that changes in design, structure and arrangement may be made without departing from the spirit and scope of the appended claims.

I claim:

1. In a valve, the combination of: a two part valve case embodying a high pressure body part and a low pressure housing part meeting on a transverse parting plane and secured rigidly to one another, said low pressure housing part having a cavity therein facing said high pressure body part, said high pressure body part having a plane surface facing said housing cavity, and having four equally spaced fluid ports opening therethrough, fluid passages in said high pressure body communicating with said ports and coupling means for connecting said passages to external fluid lines, said body having also a centrally located port opening through said surface and communicating with one of said fluid passages, and a ported valve rotor rotatably mounted in said body cavity embodying two parallel plates and having parallel spaced webs integrally interconnecting said plates, said rotor disposed in said body cavity with one of said plates adjacent said plane body part surface, there being a central port in said one plate between said webs and extending through said plate into register with said central body part port, thereby establishing constant communication between the housing cavity and said one of said body part fluid passages, whereby said housing cavity is constantly drained to said one passage in all positions of the valve rotor, said webs having parallel fluid passages therein extended through said one valve rotor plate and terminating in four ports spaced to register with said four body part ports.

2. The valve of claim 1, wherein said one rotor plate has also a port extending therethrough between said webs and which is positionable by rotation of said rotor to register with the body port which is diametrically across from said one body port with which the centrally located body port has communication.

References Cited in the file of this patent

UNITED STATES PATENTS

| Number | Name | Date |
|---|---|---|
| 804,909 | Young | Nov. 21, 1905 |
| 1,003,752 | Jenkins | Sept. 19, 1911 |
| 1,118,297 | McElroy | Nov. 24, 1914 |
| 1,166,350 | Goudard | Dec. 28, 1915 |
| 1,421,441 | Flinn | July 4, 1922 |
| 1,809,432 | Webb | June 9, 1931 |
| 2,186,657 | Saussure | Jan. 9, 1940 |
| 2,192,835 | Leach | Mar. 5, 1940 |
| 2,377,473 | Wolcott | June 5, 1945 |
| 2,428,410 | Daniels | Oct. 7, 1947 |
| 2,545,774 | Griswold | Mar. 20, 1951 |
| 2,558,087 | Holl | June 26, 1951 |
| 2,564,444 | Parsons | Aug. 14, 1951 |
| 2,578,160 | Van der Werff | Dec. 11, 1951 |

OTHER REFERENCES

Handbook on Synthetic Rubber Packings, 5th edition, published by E. F. Houghton & Co., Philadelphia, 1952, relied upon. Copy in Div. 39, cited as Houghton.